Patented Aug. 6, 1946

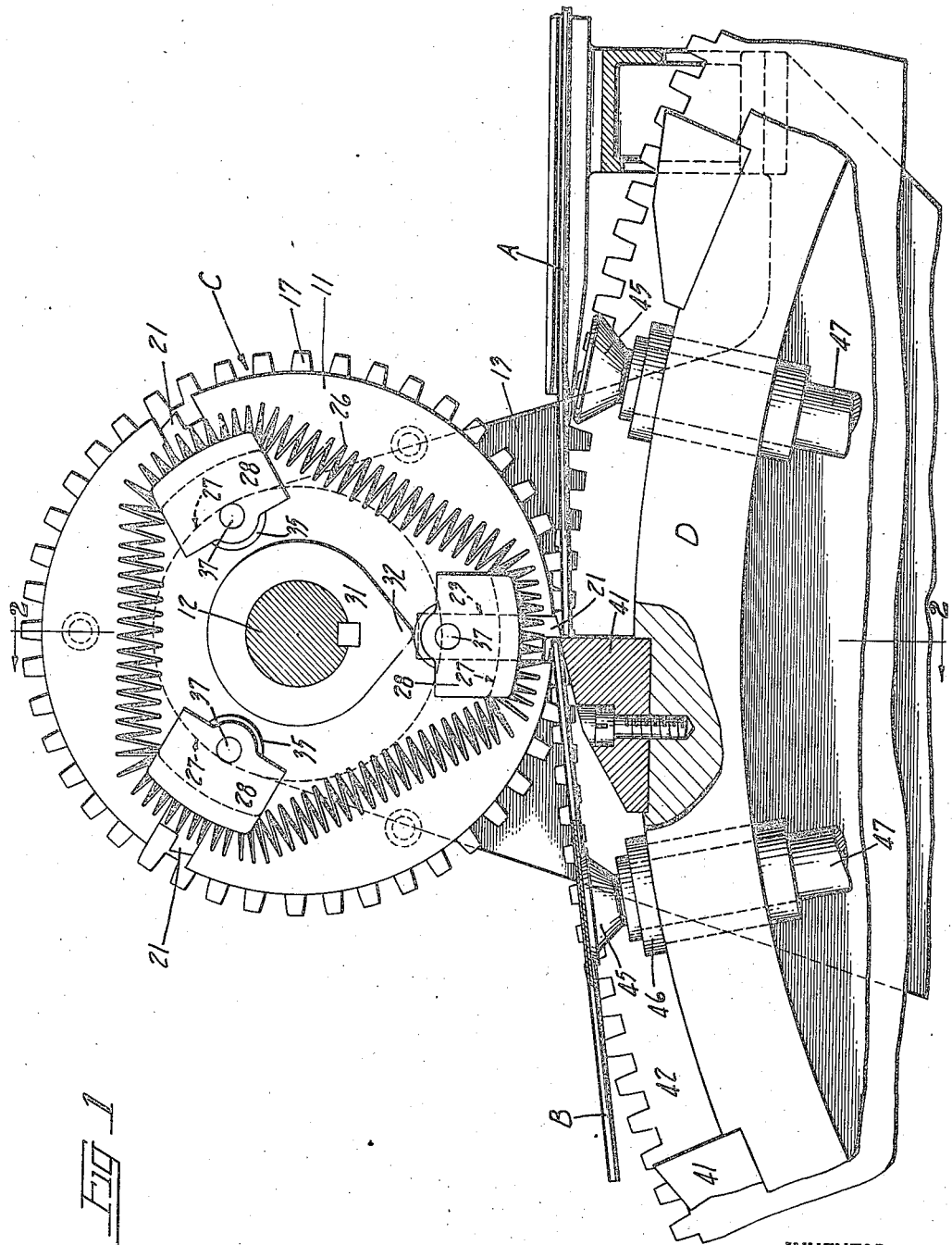

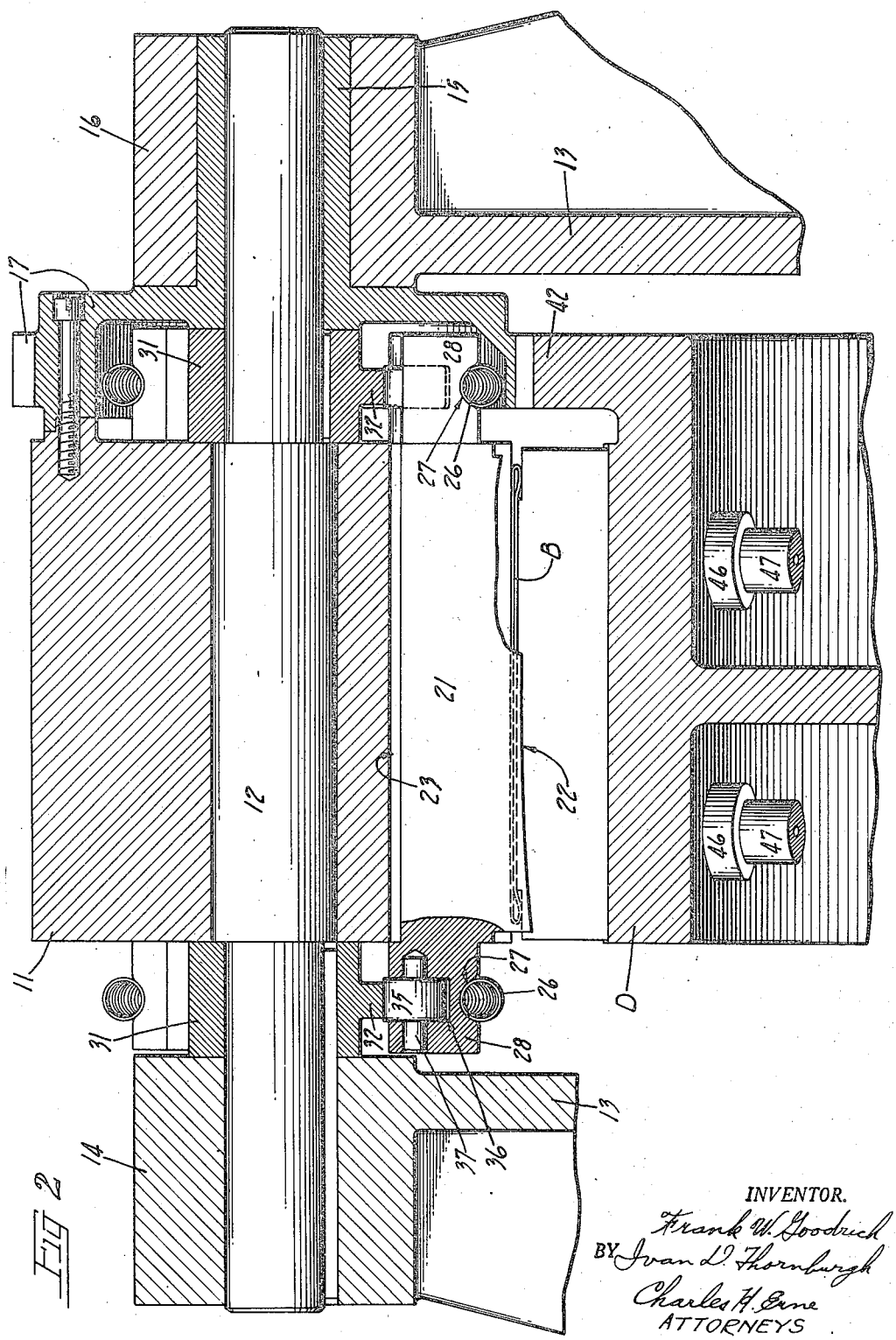

2,405,204

UNITED STATES PATENT OFFICE 2,405,204

CUTTING DEVICE

Frank W. Goodrich, Newark, N. J., assignor to American Can Company, New York, N. Y., a corporation of New Jersey Application December 3, 1943, Serial No. 512,833

3 Claims. (Cl. 164—68)

1

The invention relates to cutting devices for severing strip or web material into desired lengths and has particular reference to an improved high speed rotary shear for cutting the material while it is moving continuously.

An object of the invention is the provision of a continuously operating rotary shear having a plurality of cutting elements designed for high speed operation on continuously moving strip or web material for cutting the material into desired lengths.

Numerous other objects and advantages of the invention will be apparent as it is better understood from the following description, which, taken in connection with the accompanying drawings, discloses a preferred embodiment thereof.

Referring to the drawings:

Figure 1 is a longitudinal section taken through a cutting device embodying the instant invention, with parts broken away; and Fig. 2 is a transverse section taken substantially along the line 2—2 in Fig. 1.

As a preferred embodiment of the invention the drawings illustrate a rotary shear cutting device for cutting a substantially continuous strip or web A of material into predetermined lengths to form blanks B from which can bodies and other articles are made. In the present case the web preferably is a tube of aluminum which has been flattened to form a double wall ribbon for convenience in shipment and handling. Such a ribbon of tubing when cut into can body lengths is ideal for the high speed production of aluminum can bodies.

In such a cutting device the ribbon A of tubing is fed in any suitable manner along a horizontal path of travel between a rotary cutting head C and a turret D and is cut off into can body lengths as it advances. The cut off blanks B are delivered by the turret to any suitable place of deposit.

The cutting head C includes a rotatable head member 11 which is freely mounted on a stationary support shaft 12 carried in a pair of spaced and parallel side frames 13 which constitute the main frame of the device. One end of the shaft is carried in a bearing 14 formed on one of the frames and is keyed in place to hold the shaft stationary. The opposite end of the shaft is mounted in a rotatable bearing sleeve 15 journaled in a bearing 16 formed in the other frame 13. The head is continuously rotated by a hollow ring gear 17 which is formed on the inner end of the bearing sleeve and which is bolted to the head.

The head member 11 carries a plurality of radial cutter blades or elements 21 for cutting off the blanks B from the moving ribbon A of tubing. These blades extend transversely of the

2 path of travel of the ribbon of tubing through the device and are formed with curved sharp cutting edges 22 for effectively cutting through the edges of the double wall ribbon. There are preferably three of these cutting elements and they are disposed in transverse, radial slideways 23 formed in the head member and are spaced equally around its periphery.

During a major portion of each cycle of rotation of the head member 11, the sharp cutting edges 22 of the cutting blades 21 are held in a retracted position within their slideways 23 under spring pressure. This is brought about by a pair of endless or continuous tension springs 26 which are located one adjacent each end of the head member 11. The springs rest in curved seats 27 formed in pressure blocks 28. The drawings show the ends of each cutting blade 21 as extending beyond the outer ends of the head member. It is the two end extensions of each blade that form two pressure blocks 28.

As the head member 11 rotates, in a clockwise direction as viewed in Fig. 1, it carries the cutting blades 21 around with it through a circular path of travel. For the upper part of the travel the blades are retracted. As a blade comes adjacent the ribbon A, it is radially projected beyond the periphery of the head member and its cutting edge comes into cutting engagement with the ribbon. This severs the can body blank B from the ribbon.

In this way the cutting blades 21 move down in succession and cut off the desired length of ribbon. The blade movement is brought about by cam action. For this purpose a stationary edge cam 31 is located just beyond each of the outer ends of the head member 11. These cams are mounted on the stationary support shaft 12 and are keyed in place to hold them against rotation. At the bottom each cam is formed with a high point 32 this being at the point of tangency with the turret D. It is the two high points of the cams that shift the blades outwardly for cutting.

Each pressure block 28 carries a cam roller 35 which is located in a recess 36 formed in the pressure block. The cam rollers are carried on pivot pins 37 secured in the blocks. These cam rollers ride over the high points 32 of the cams 31 and thus move the pressure blocks and the integral cutting edges 22 outwardly into cutting position. This action is performed against the resistance of the springs 26.

Auxiliary cutter blade elements 41 are carried on the turret D. This turret is cylindrical in shape and is mounted on a drive shaft (not shown) which is journaled in suitable bearings formed in the side frames 13. The shaft may be rotated in any suitable manner in a counterclockwise direction, as viewed in Fig. 1. A spur gear 42 carried by the turret meshes with the gear 17 on the head member 11 and this insures synchronism in rotation between the head member and the turret.

The auxiliary cutter blade elements 41 are merely shear blocks or anvil blocks which back up the ribbon A when it is being engaged and cut by the sharp cutting edges 22 of the blades. There are a plurality of these blocks and they are secured to the outer peripheral face of the turret D and are arranged around the turret in spaced order at distances corresponding to the body lengths.

Provision is made for holding a cut off body blank B onto the turret after it has been severed from the ribbon A. This is brought about by a pair of yieldable suction cups 45. There are as many pairs of suction cups as there are auxiliary cutter blade elements 41, each pair being arranged transversely of the turret D. Each cup is mounted on a coupling 46 secured in the face of the turret and is connected by a tube 47 to a suitable source of vacuum. The yieldable character of the suction cups in engaging the cut or severed flat blanks B moving in a different plane or direction of travel from that of the web A, is clearly shown at the left in Fig. 1.

As the rotating turret D brings a pair of these suction cups 45 into position adjacent the ribbon A, the cups grip the ribbon and hold fast during cutting of the blank B. After severance of the blank the cups continue to hold the blank while the rotating turret carries it to any suitable place of deposit. The blank will be discharged from the turret by breaking the vacuum in the suction cups, but this feature forms no part of the present invention.

With such a construction of rotary cutting devices, continuous feeding of the ribbon A and continuous cutting of blanks B therefrom may be obtained without interruption. This is desirable for high speed production such as is incident to the production of can body blanks.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a rotary shear for severing rigid metallic web material, the combination of a rotatable head member having a transverse radial slideway formed therein, a main cutter blade slidably disposed in said slideway and having a cutting edge, a cam roller carried on said cutter blade, a stationary cam adjacent said head member and against which said cam roller operates for shifting said cutter blade in its slideway, a turret rotatable adjacent to and in synchronism with said head member, an auxiliary cutter blade rigidly secured on said turret for cooperating with said main cutter blade to transversely cut the web material into a plurality of flat sections during movement of the web between said head member and said turret, and yieldable suction cups projecting radially from and around the periphery of the turret for engaging and holding the successive cut sections of web material relative to the turret periphery during and after severing of the web by the main and auxiliary cutter blades while the rigid web and cut sections thereof are respectively moving in different paths of travel.

2. In a rotary shear for severing rigid metallic web material, the combination of a cylindrical rotatable head member having a plurality of transverse radial slideways formed therein and spaced around its outer periphery, a plurality of main cutter blades disposed one in each of said slideways and movable to a position projecting beyond the periphery of said head member, a cam roller carried on each cutter blade, a stationary edge cam disposed adjacent said head member and against which a said cam roller operates for shifting said cutter blades successively in their slideways, an endless tension spring member engageable with each of said cutter blades for maintaining their cam rollers in engagement with said cam, a turret rotatable adjacent to and in synchronism with said head member, a plurality of auxiliary cutter blades rigidly secured on said turret and spaced around its periphery for cooperation with said main cutter blades to transversely cut the web material, and yieldable suction cups projecting radially from and around the turret periphery for engaging and holding the successive severed sections of web material relative to the turret periphery during and after severing of the web by the main and auxiliary cutter blades while the rigid web and cut sections thereof are respectively moving in different paths of travel.

3. In a rotary shear for severing rigid metallic web material, the combination of a cylindrical rotatable head member having a plurality of transverse radial slideways formed therein and spaced around its outer periphery, a plurality of main cutter blades disposed one in each of said slideways and movable to a position projecting outwardly beyond the periphery of said head member, said cutter blades extending laterally of said head member at both ends thereof, a pair of cam rollers carried one on each end of each of said cutter blades, a pair of stationary edge cams disposed one adjacent each end of said head member and against which said cam roller operates for shifting said cutter blades successively in their slideways, a pressure block formed on the extended ends of each of said cutter blades, a pair of continuous tension springs located one at each end of said head member and bearing against all of the pressure blocks at each end of said head member for holding the cam rollers in engagement with said cams, a turret rotatable adjacent to and in synchronism with said head member, a plurality of auxiliary cutter blades rigidly secured on said turret and spaced around its periphery for cooperation with said main cutter blades to transversely cut the web material continuously while moving between said head member and said turret, and yieldable suction cups projecting radially from and around the periphery of said turret for engaging and holding successive cut sections of the web material relative to the turret periphery during and after severing of the web by the main and auxiliary cutter blades while the rigid web and cut sections thereof are respectively moving in different paths of travel.

FRANK W. GOODRICH.